United States Patent [19]

Bone et al.

[11] 4,006,266
[45] Feb. 1, 1977

[54] PROCESS FOR MAKING A DRY PET FOOD HAVING A HARD COMPONENT AND A SOFT COMPONENT

[75] Inventors: David Palmer Bone, Palatine; Edward Leo Shannon, Barrington, both of Ill.

[73] Assignee: The Quaker Oats Company, Chicago, Ill.

[22] Filed: Oct. 8, 1975

[21] Appl. No.: 620,720

[52] U.S. Cl. .............................. 426/623; 426/630; 426/635; 426/639; 426/641; 426/656; 426/805

[51] Int. Cl.² .......................................... A23L 1/16

[58] Field of Search .......... 426/630, 635, 615, 623, 426/805, 311, 331, 639, 641, 656

[56] References Cited

UNITED STATES PATENTS

| 3,202,514 | 8/1965 | Burgess et al. | 426/643 |
| 3,365,297 | 1/1968 | Burgess et al. | 426/623 |
| 3,380,832 | 4/1968 | Bove et al. | 426/272 |
| 3,467,525 | 9/1969 | Hale et al. | 426/623 |
| 3,908,025 | 9/1975 | Miller et al. | 426/623 |

*Primary Examiner*—Raymond N. Jones
*Attorney, Agent, or Firm*—Mathew R. P. Perrone, Jr.

[57] ABSTRACT

A dry pet food is formed by mixing a soft meat-like dry pet food and a hard dry pet food together.

9 Claims, No Drawings

PROCESS FOR MAKING A DRY PET FOOD HAVING A HARD COMPONENT AND A SOFT COMPONENT

BACKGROUND OF THE INVENTION

This invention relates to food, and more particularly to a dry pet food having both hard and soft characteristics.

Within the general class of pet foods, there are three basic subdivision: (1) dry pet foods; (2) semi-moist pet foods; and (3) moist pet foods. Each pet food of the particular class differs from the other pet food classes in that differing packaging techniques and palatability levels are achieved. (Hereafter pet includes dog or cat and vice versa.) Generally speaking the palatability level increases as the difficulty of packaging increases. The dry pet food contains the least amount of moisture and is the most stable. Therefore, the dry pet food requires the least sophisticated packaging and is the simplest to handle and store. The semi-moist pet food requires somewhat more sophisticated packaging than does the dry pet food, but does not have to be sterile at packaging. The semi-moist pet food contains an intermediate range of moisture. The moist pet food has the highest moisture content of the three classes of pet food and is generally rated highly palatable. However, this pet food requires sterile packaging techniques. Thus, it may be seen that a dry pet food requires the simplest packaging techniques.

Dry pet food, while being very stable and easiest handle and store, is not as palatable as the other classes of pet food. Conventionally, the dry pet food is a hard abrasive type of pet food. Although proper nutrition is provided by this hard abrasive pet food, the pet does not necessarily accept this dog food due to its hard abrasive nature. Yet in many cases, the hard abrasive nature is desired for teeth cleaning characteristics in addition to the nutrition and ease of storage. Thus, it is difficult to feed a dry pet food, with all of its inherent advantages, due to palatability problems.

One possible solution for improving the palatability of the dry pet food is adding water thereto. While such addition of water provides a somewhat increased palatability, the substantially hard dry particles are softened and, thereby, lose some — if not all — teeth cleaning attributes. This solution, therefore, is not suitable because you sacrifice too much of the desired teeth cleaning attributes to achieve palatability. The problems are not offsetting. Thus, this solution does not provide a desirable result.

On occasion, mixtures of conventional dry pet foods with semi-moist or canned pet foods are feasible for overcoming the palatability problems. However, such mixtures invariably result in rapid textural changes in the respective components. Moisture transfers from the semi-moist or canned component to the dry component, causing its inherent hard texture to become soft. Similarly, loss of moisture from the semi-moist component causes their inherent, soft, elastic meat-like textures to become hard. This creates two problems. The conventional dry dog food has its teeth cleaning attributes reduced or removed. The changes in the semi-moist result in a product having reduced palatability. Further more, at the high levels of moisture content in the canned pet food, the onset of microbiol spoilage is inevitably rapid. Thus, mixtures of conventional dry dog food with canned foods immediately prior to feeding has been the only possible way to achieve the advantages of the three classes of pet foods in combination. Also, the food formed by this practice requires immediate consumption by the pet in order to avoid the textural instability and the onset of the microbiological spoilage that inherently occurs.

Some progress is evident in the field of a soft dry pet food. However, this progress does not extend to the desirable teeth cleaning characteristics inherent in a dry pet food of the hard type. So, while there are two different types of dry pet food — hard pet food and soft dry pet food — there is no dry pet food combining the attributes of the hard pet food and the soft dry pet food. The soft dry pet food has the more palatable soft meat-like texture which makes the soft pet food in the dry state acceptable to pets. However, this pet food as above-stated lacks the desired teeth cleaning characteristics.

A mere routine mixing of the soft dry pet food and the hard pet food may be operable - even for marketing. However, the mixture must be highly stable for marketing and the inherent long periods of storage. It is, therefore, desired to improve and lengthen the time for storage and stability of a mixture of soft dry pet food and hard dry pet food. The lengthening and improvement thereon is a complex problem requiring substantial effort and research.

Thus it may be seen that it is advantageous to provide a dry pet food having both hard and soft characteristics.

SUMMARY OF THE INVENTION

Therefore, it is an object of this invention to provide a dry pet food having soft meat-like characteristics.

It is a further object of this invention to provide a dry pet food having teeth cleaning attributes.

It is a still further object of this invention to provide a dry pet food having no adverse effects from moisture transfer problems.

It is a further object of this invention to provide a dry pet food having improved palatability.

Also an object of this invention is to provide a dry pet food having palatability and hardness characteristics.

These and other objects of this invention are met by providing a dry pet food containing a hard dry pet food component and a soft dry pet food component.

DESCRIPTION OF THE PREFERRED EMBODIMENTS

A dry pet food containing both a hard component and a soft component is formed.

Generally speaking a hard dry pet food contains crude protein, crude fat, crude fiber, ash, and other minerals and additives. Typical of the protein components includes the meat and bone meal and vegetable protein sources such as soybean meal. Corn meal and wheat feed flour are also suitable for adding to the hard dry pet food. Other components are also suitable for use in this pet food.

By "dry pet food" is meant one that has a moisture content less than 15 percent by weight and typically about 10 percent. Hereinafter, all percentages referred to are understood to be by weight unless specified otherwise and are based upon the weight of the final product.

By "admixed dog food" is meant one that consists of a hard substantially amylaceous particle intermixed with separate soft, meat-like non-amylaceous particles.

The substantially amylaceous particle is hereinafter referred to as the "hard component" unless specified otherwise and the substantially non-amylaceous particles will hereinafter be referred to as the "soft component" unless specified otherwise.

The hard and dry pet food, and the soft and dry pet food are well known in the art. A typical hard and dry pet food is disclosed in U.S. Pat. No. 3,467,525 to Hale et al. A typical soft and dry pet food is disclosed in U.S. Pat. No. 3,883,672 to Bone et al. Relative hardnesses of the hard component range from 60 to 90. Relative hardnesses of the soft component range from about 1.5 to about 2.5. More preferably, the relative hardness of the hard component is about 80. More preferably, the relative hardness of the soft component is about 2. Basically however, the difference between a hard and dry pet food and soft and dry pet food with respect to hardness is well known in the art. Thus the hardness ranges set forth above are given by way of example only and are not intended to be limited. The hardness values as referenced above are determined by advancing a 60° conical penetrator into the respective product samples and using an Instron load — measuring system to obtain numbers and values measured in kilograms of force increase per centimeter of penetrator motion into the product.

The hard component is essentially a modified conventional type dry dog food processed to specifications of composition, moisture content, and water activity, that makes it compatible with the soft component. Similarly, the soft component is processed to modified specifications of composition, moisture content, and water activity that permits compatibility with the hard component.

The hard component is composed of a vegetable protein source, amylaceous ingredients such as cereal grains or starch, fats, and an animal protein source. While the quantity of protein source, amylaceous ingredient, fat, and animal protein source is considered to be within the skill of the art, a typical quantitative range of these ingredients includes from about 10–30 percent vegetable protein source, from about 20–60 percent amylaceous ingredients, from about 5–15 percent fat, and from 5–25 percent animal protein source — with percentages based on the weight of the hard component.

Vitamins, minerals, colors, flavors, and other known supplements may be used as well to enhance the pet food properties. Included in the vitamin mineral supplements are ingredients such as choline chloride, magnesium oxide, vitamin A, $B_{12}$, $D_3$, and E, riboflavin, niacin, folic acid, pyridoxine hydrochloride, thiamine mononitrate, calcium pantothenate. Such supplements are commonly used up to about 5 percent of the final product.

By "vegetable protein source" is meant those vegetable ingredients normally containing 20 percent or more protein by weight. Example of vegetable protein sources are soybean oil meal, soybean flour, soy protein concentrate, soy protein isolates, cottonseed meal, cottonseed flour, cottonseed protein concentrates, cottonseed protein isolates, peanut meal, peanut flour, peanut protein concentrates, peanut protein isolates, corn germ, corn germ meal, wheat germ, wheat germ meal, wheat gluten, corn gluten meal, corn gluten feed, corn distiller's dried grains, dried corn distiller's solubles and any other edible proteinaceous vegetable foodstuff.

By "amylaceous ingredients" is meant those foodstuffs containing a preponderance of starch and/or starch-like material. Examples of amylaceous ingredients are cereal grains and meals or flours obtained upon grinding cereal grains such as corn, oats, wheat, milo, barley, rice, and the various milling by-products of these cereal grains such as wheat feed flour, wheat middlings, mixed feed, wheat shorts, wheat red dog, oat groats, hominy feed, and other such material. Also included as souces of amylaceous ingredients are the tuberous foodstuffs such as potatoes, tapioca, and the like. Other examples of amylaceous ingredients are the various edible grain or tuberous starches and modified starches.

By the term "modified starch" we mean the use of thin-boiling (acid or oxidized treatment) or thick boiling regular grain or tuberous starch, high amylose corn starch or waxy starch, or combinations thereof, either pregelatinized before, after, or distinct from the treatment with crosslinking agents such as sodium trimetaphosphate or phosphorus oxychloride alone or in conjunction with alkylating agents such as propylene oxide, or acetylating agents such as acetic anhydrides.

The soft component is composed of sugar, proteinaceous adhesive, animal protein source, vegetable protein source, fat, and plasticizing agent. While the quantity of sugar, proteinaceous adhesive, animal protein source, vegetable protein source, fat, and plasticizing agent is considered to be within the skill of the art, a typical quantitative range of these ingredients includes from about 0–30 percent sugar, 4–60 percent proteinaceous adhesive, 0–25 percent animal protein source, 0–40 percent vegetable protein source, 0–15 percent fat, and 5–20 percent plasticizing agent.

By the term "sugar" is meant any known sugar utilized in the food art and especially those listed in U.S. Pat. No. 3,202,514 to Burgess et al.

Proteinaceous adhesives are of two general classes, natural and modified. Examples of natural proteinaceous adhesives are collagen, albumens, and casein and its single salts such as sodium caseinate, calcium caseinate, ammonium caseinate, potassium caseinate, and magnesium caseinate.

Examples of proteinaceous adhesives derived by modification of natural proteins are alkali modified oil seed vegetable proteins such as alkali modified soy protein isolates, alkali modified soy proteinates, alkali modified soy flours, alkali modified soy concentrates, alkali modified wheat gluten, alkali modified cottonseed flour, alkali modified cottonseed protein isolates, alkali modified peanut flour or meal, alkali modified peanut protein isolate, and other alkali modified proteins such as contained in or derived from products such as yeast, blood, albumen, keratins, myosin, and other food proteins wherein the modification consists of the salts or proteinates such as sodium caseinate, calcium caseinate and the like.

The term "modified protein" and "alkali modified protein" is used interchangeably herein. By modified or alkali modified protein is meant one that is subjected to an alkaline hydrolysis such as the alkaline hydrolysis of an oil seed vegetable protein such as that disclosed in application Ser. No. 478,751, filed June 12, 1974 by Kumar et al., now U.S. Pat. No. 3,917,877, which is hereby incorporated by reference. Generally, this modification proceeds by forming an aqueous slurry of a protein material containing at least 50 percent protein. The pH of the slurry is then adjusted to a pH of from 7 to 10.5 by adding to the aqueous slurry an alkali metal carbonate. A pH of 8 is preferable. The slurry is then heated to react the protein with the alkali metal carbonate. The reaction temperature required depends upon the specific protein used but generally ranges from 295°–310° F. The slurry is then neutralized to a pH of from 6.6 to 7.0 by the addition of an edible acid. If desired, the protein may be subjected to a fermentation with a yeast before forming the aqueous slurry. The slurry may be added to the mixture directly as a slurry or it may be dried first to remove most of the water.

Plasticizing humectant agents utilized within the scope of the invention include glycerol, propylene glycol, 1,3-butanediol and mixtures thereof which give the most stable admixture. However, other low molecular weight equivalent agents are suitable for food use. A preferred molecular weight is about 150 or less. The quantitative range of plasticizing/humectant agent utilized in the present invention ranges from 5 to about 10 percent by weight of the soft component. While the plasticizing agents listed or a combination of those listed may be used, it is preferable that from 5–10 percent of the dough within the soft component consist of propylene glycol as the most effective plasticizer/humectant for the particular purpose.

Briefly stated, the novel aspects of the present invention involve processing a hard component of a dry pet food that is substantially amylaceous and having a moisture content of 8–12 percent and a critical water activity of 0.60–0.75 (defined in U.S. Pat. No. 3,380,832 to Bone incorporated herein by reference) and admixing said hard component with a processed soft component containing specific proteinaceous adhesives and plasticizing/humectant agents and having no amylaceous ingredient and having a moisture content of 11–14 percent and a critical water activity of 0.60–0.75 such that no substantial transfer of moisture occurs between said soft component and said hard component during prolonged storage and such that no substantial change in texture, appearance, or keeping qualities occurs in either the hard component or the soft component during prolonged storage as a dry dog food.

Generally, the hard component of this invention having a moisture content from 8–12 percent and a water activity of 0.60–0.75 can be produced by blending a mixture of amylaceous ingredients, animal and vegetable protein sources, minerals, and sufficient water for processing and then cooking said mixture by baking or extrusion followed by cooling and drying as required to reduce the moisture content of the product to the desired range. Should the moisture content fall outside the desired range of 8–12 percent adjustments in process water and/or process conditions to obtain the desired moisture level is within the purview of those skilled in the art. There may be occasions when the moisture content of the product is in the desired range of 8–12 percent and the water activity value of the product is higher than the upper permissable limit of 0.75. Should this condition prevail, leading to incompatibility of said hard component admixed with said soft component, it is necessary to alter the composition of the hard component, for example, by increasing the level of salt, sugar, or other soluble materials. There may also be occasions when the moisture content of the hard component product is within the desired range of 8–12 percent and the water activity of the hard component product is less than the lower permissible limit of 0.60. Should this condition prevail, leading to incompatibility of said hard component admixed with said soft component, it is necessary to alter the composition of the hard component, for example, by decreasing the level of salt or other sources of soluble materials — for example pH might require an adjustment toward neutrality to reduce the hydrolysis of amylaceous ingredients to soluble components during processing.

More specifically, the first component of the hard dry dog food is formed by adding the components thereof to a dough mixer. From the dough mixer the thus formed dough is passed to forming rolls and shaped into a sheet. Then the sheet is baked and kibbled. Following the kibbling operation cooling is undertaken. The hard dry dog food is now prepared for combining with the soft meat-like dry dog food.

Generally, the soft component of this invention, having a moisture content of from 11–14 percent and a water activity of 0.60–0.75 can be produced by blending a mixture of sugar, vegetable protein source, animal protein source, proteinaceous adhesive, plasticizing/humectant agent, and fat and then cooking said mixture in an extruder at a temperature of 215°–280° F. The cooked mixture is discharged through a forming die or passed through a separate forming machine, cooled, cut to size and blended with particles of hard component. The mixture is processed to yield a semimoist like soft elastic but dry pet food particle resembling meat in both texture and appearance and having a water activity value of 0.60 to 0.75.

The soft meat-like dry dog food is also prepared by adding it to a dough mixer. The components upon leaving the dough mixer are conveyed to an extruder. After extrusion the dough is shaped and cut. Then, the dough is cooled. At this point particles of the soft meat-like pet food are mixed with particles of the hard dry pet food and packaged to form the desired product.

Should the moisture content of the soft component fall outside the desired range of 11–14 percent, adjustments in process water and/or process conditions to obtain the desired moisture level in the product is within the purview of those skilled in the art. There may be occasions when the moisture content of the soft component product is in the desired range of 11–14 percent and the water activity value of the product is higher than the upper permissable level of 0.75. Should this condition prevail, leading to incompatability of said soft component with said hard component, it is necessary to alter the composition of the soft component by increasing the level of plasticizer/humectant such as propylene glycol, or by increasing the level of other soluble materials such as sugar or salt. There may also be occasions when the moisture content of the soft component is within the desired range of 11–14 percent and the water activity of the soft component product is less than the minimum permissable limit of 0.65. Should this condition prevail, leading to incompatibility of the said soft component with said hard component upon subsequent admixture, it is necessary to alter the composition of the soft component by decreasing the content of plasticizer/humectant agent and/or decreasing the level of sugar and/or salt.

By sufficient water for processing is meant that amount of water required not only to produce a product having a moisture content from 8–12 percent or from 11–14 percent respectively for said hard component and said soft component, but also any additional water required to process the mixture into a pet food product.

The soft meat-like component is mixed with the hard component. The resultant pet food is storable as a dry pet food. Yet each component retains its initial characteristics. The food does not require additional moisture prior to feeding in order to obtain a requisite high palatability.

Generally, the admixture of said hard component with said soft component is achieved by blending particles of hard component with particles of soft component in a rotary tumbler device or other such means within the purview of one skilled in the art. When the soft component is in a stranded or "burger" form it is desirable to refrain from cutting the strands after extrusion, and to use the attrition prevailing during blending of the soft component strands with hard component particles to effect the breakup of strands into shorter pieces, as desired. If desired, the soft component may be coated with an edible coating by tumbling or other means with 1–2 percent fat or a malto-dextrin solution followed by drying prior to blending with hard component as a means of increasing the meat-like appearance.

In order to illustrate without unduly limiting the novel aspects of the present invention, the following examples are presented. In the examples, percentages are by weight based on the weight total of the ingredients used in processing.

Example 1

|  | A<br>Hard Dry<br>Component<br>% by Weight | B<br>Soft Dry<br>Component<br>% by Weight |
|---|---|---|
| Amylaceous flour and meal | 58.10 | — |
| Sucrose | — | 26.21 |
| Modified soy protein isolate | — | 9.43 |
| Meat and bone meal | 10.42 | 8.79 |
| Defatted soy flour | 8.33 | 16.98 |
| Animal fat | 3.75 | 6.11 |
| Defluorinated phosphate | 2.08 | 4.26 |
| Iodized salt | 0.50 | 0.56 |
| Potassium chloride | — | 0.28 |
| Vitamin-mineral mix | 0.12 | 0.56 |
| Antioxidant | 0.01 | — |
| Food color | 0.01 | 0.04 |
| Propylene glycol | — | 7.55 |
| Carboxymethylcellulose | — | 0.37 |
| Water | 16.68 | 18.86 |
|  | 100.00 | 100.00 |

Preparation of hard dry component (A):

Formula weights of ingredients except water are first blended in a suitable mixer such as a horizontal mixer for several minutes and then mixed with the formula weight of water in a continuous extrusion mixer or suitable device and the extrudate dough is passed through sheeting rolls to form a sheet about 4 feet wide and about ⅜ inches thick. The continuous sheet of dough is then transported on a wire mesh continuous belt through a baking oven containing a number of heating zones ranging in temperature from about 450° F. to about 550° F. and requiring a throughput time of about 8–10 minutes through the oven. The baked biskit from the baking oven is then passed through kibbling rolls, and stored without further drying. Water activity of the stored product was determined to be in the range 0.65–0.75 at a moisture content of about 12 percent.

To prevent growth of yeasts and molds due to local condensation of moisture, approaching or exceeding about 15 percent moisture in the product, it may be desirable to coat the product with a suitable mold inhibitor such as potassium sorbate or sorbic acid at a level of about 50–100 ppm.

Preparation of soft dry component (B):

For each 100 lb. of dough prepared, a sugar premix is made consisting of:

|  | Lb. |
|---|---|
| Water | 18.86 |
| Propylene Glycol | 2.83 |
| Carboxymethylcellulose | 0.37 |
| Sucrose | 26.21 |
|  | 48.27 |

Carboxymethylcellulose and propylene glycol are blended in a waring blender and mixed with the water by stirring with a lightening mixer. The sucrose is then added while stirring.

The remainder of the formula ingredients are mixed by blending the dry components in a horizontal mixer or a sigma blade mixer, for about 1 minute, adding melted animal fat plus the remaining formula weight of propylene glycol and blending an additional 2 minutes, and finally adding the formula weight of sugar premix and blending 5 minutes. The mix is then fed into a screw extruder having a 4 inch diameter screw with a compression ratio of 5.22 a full pitch — profile of 8 L/D for the feed section, 6 L/D for the transition section, and a profile of 12 L/D for the metering section, a flight depth of 1-⅛ inches in the feed section and 0.225 inches in the metering section, RPM of the screw is 30.5, and back pressure varied between 90 to about 115 psig. The production rate or throughput rate is about 450 pounds per hour. Steam jacket pressure for heating the extruder varies between 0 to about 220 psig on each of the 4 heating zones on the extruder barrel. Extrudate temperature ranged from about 215° to 280° F., with and average of 253° F.

The cooked extrudate leaving the extruder die is then discharged into a Hobart grinder fitted with a die plate consisting of a multiplicity of 5/32 inch diameter holes which thereby formed a multiplicity of continuous strands of product which are discharged onto an air cooled wire mesh continuous conveyor. The $A_w$ of the strands is in the range 0.65–0.75 at a moisture content of 11–14 percent.

The conveyed strands are then mixed by tumbling with hard component (A) in a ratio of 60 parts of (A) to 40 parts (B) and packaged. The product is a mixture of hard dry type dog food and soft, meat-like dog food, and these attributes are retained during storage.

EXAMPLE 2

Same method as Example 1 except that the soft dry product was prepared by discharging the cooked extrudate from the extruder through a die plate consisting of a single die hole, transporting the single strand extrudate on a wire mesh air cooled continuous belt and dicing the single strand of cooled extrudate into bite size pieces about ½ – ¾ inch per side on an Urschel Model J dicer. The $A_w$ of the particles is in the range 0.60–0.75 and the moisture content is about 12.5–13.5 percent.

The soft dry particles (B) are then mixed by tumbling with hard component (A) in a ratio of 60 parts (A) to 40 parts (B) and packaged. The product is a mixture of hard dry type dog food and dry, soft, meat-like dog food and these attributes are retained during storage.

Example 3

|  | A<br>Hard Dry<br>Component<br>% by Weight | B<br>Soft Dry<br>Component<br>% by Weight |
|---|---|---|
| Amylaceous flour and meal | 47.30 | — |
| Solvent soybean meal | 13.21 | — |
| Modified soy protein isolate | — | 10.00 |
| Meat & bone meal | 14.84 | 9.40 |
| Defatted soy flour | — | 18.00 |
| Animal fat | 4.06 | 6.50 |
| Defluorinated phospate | — | 4.50 |
| Iodized salt | 0.94 | 0.60 |
| Dried yeast | 0.81 | — |
| Vitamin-mineral mix | 0.065 | 0.60 |
| Antioxidant | 0.008 | — |
| Onion powder | 0.040 | — |
| Color | 0.027 | 0.05 |
| Corn syrup 36 D.E. | — | 28.70 |
| KCl | — | 0.30 |
| Propylene Glycol | — | 8.00 |
| Water | 18.70 | 13.00 |
| CMC | — | 0.40 |
|  | 100.00 | 100.00 |

Preparation of hard dry component (A):

Dry ingredients are blended on a horizontal mixer for about 10 minutes and metered with sufficient water and steam into an extruder such as a Sprout Waldron, Anderson, or Wenger, to give a dough containing 25–30 percent moisture. The dough is mixed and cooked under pressure and temperatures of about 250°–300° F. and at pressures of 100–1000 psig and discharged through a die plate whereupon the extrudate expands and is cut into particles. The particles are then dried to 8–12 percent moisture, and have an $A_w$ of 0.60–0.75. The particles are cooled after drying and coated with the formula weight of animal fat.

Preparation of soft dry component (B):

Same procedure as Example 1 and Example 2 except corn syrup is substituted for sucrose in preparing the sugar premix.

Components A and B are then blended in a ratio of 60 parts A to 40 parts B and packaged.

Obviously, modifications of this invention are possible. It is understood, therefore, that this application is intended to cover any variations, uses, or adaptations of the invention as may be considered to be known or customary practice in the art to which this invention pertains.

Having fully described and disclosed the invention, it is claimed:

1. A process for the production of a dry pet food capable of surviving long periods of storage, and having a water activity of 0.60 to 0.75 and a component first particle that is hard in texture and substantially amylaceous admixed with a component second particle that is soft and meat-like in texture and appearance, comprising the steps of:
A. blending a first mixture comprising an amylaceous ingredient, an animal protein source, a vegetable protein source, fat, and sufficient water for processing, wherein said amylaceous ingredient comprises from about 20 to about 60 percent by weight; said vegetable protein source comprises 10–30 percent by weight, said fat comprises about 5–15 percent by weight; and said animal protein source comprises 5–25 percent by weight;
B. cooking while baking or extruding a mass of said first mixture at a temperature and time sufficient to gelatinize the said amylaceous ingredients;
C. forming particles of said first mixture;
D. cooling the cooked said first mixture to form the hard first particle having a moisture content of 8–12 percent by weight of the first particle;
E. blending a second mixture comprising a natural or modified proteinaceous adhesive, a plasticizing-/humectant agent, and sufficient water for processing, wherein said proteinaceous adhesive is present in an amount from about 4–60 percent by weight and said plasticizing/humectant agent is present in an amount from about 5–20 percent by weight;
F. cooking while extruding a mass of said second mixture to a temperature from about 215° to about 280° F.;
G. forming particles of said second mixture;
H. cooling the particles to form the soft second particle having a moisture content of 10–14 percent; and
I. admixing about 10 percent to about 90 percent be weight of the hard first particles with about 10 percent to about 90 percent by weight of the soft second particle.

2. A process according to claim 1 wherein said proteinaceous adhesive is an alkali modified protein.

3. The process of claim 1 wherein the hard component first particle is about 60 percent by weight of the dry pet food and the soft component second particle is about 40 percent by weight of the dry pet food.

4. The process of claim 3 wherein the hard component is amylaceous and the soft component is non-amylaceous.

5. The process of claim 1 wherein the soft component is coated with edible coating.

6. The process of claim 1 wherein the proteinaceous adhesive is at least one selected from the group consisting of collagen, albumen, casein, sodium caseinate, calcium caseinate, ammonium caseinate, potassium caseinate, and magnesium caseinate.

7. The process of claim 1 wherein the proteinaceous adhesive is at least one selected from the group consisting of alkali modified soy protein isolate, alkali modified soy protein flour, alkali modified soy protein concentrate, alkali modified wheat gluten, alkali modified cottonseed flour, alkali modified cottonseed protein isolate, alkali modified peanut flour, alkali modified peanut meal, and alkali modified peanut protein isolate.

8. The process of claim 1 wherein the proteinaceous adhesive is derived from at least one selected from the group consisting of yeast, blood, albumen, keratins, and myosin.

9. The process of claim 1 wherein said first mixture further comprises 0 to about 2 percent by weight salt; and wherein said second mixture further comprises about 0 to 2 percent by weight salt and 0 to about 30 percent by weight sugar.

* * * * *

UNITED STATES PATENT OFFICE
CERTIFICATE OF CORRECTION

PATENT NO. : 4,006,266
DATED : February 1, 1977
INVENTOR(S) : David P. Bone and Edward L. Shannon It is certified that error appears in the above-identified patent and that said Letters Patent are hereby corrected as shown below:

In Column 1, at the lines numbered 31 and 32, "easiest handle" should read --easiest to handle--.

In Claim 1, at line 1 of section I, "be" should read --by--.

Signed and Sealed this

Eleventh Day of October 1977

[SEAL]

Attest:

RUTH C. MASON
Attesting Officer

LUTRELLE F. PARKER
Acting Commissioner of Patents and Trademarks